(12) United States Patent
Wang et al.

(10) Patent No.: US 11,481,036 B2
(45) Date of Patent: Oct. 25, 2022

(54) METHOD, SYSTEM FOR DETERMINING ELECTRONIC DEVICE, COMPUTER SYSTEM AND READABLE STORAGE MEDIUM

(71) Applicants: Beijing JingDong ShangKe Information Technology Co., Ltd., Beijing (CN); Beijing Jingdong Century Trading Co., Ltd., Beijing (CN)

(72) Inventors: Yazhuo Wang, Beijing (CN); Yu Guan, Beijing (CN); Zhongfei Xu, Beijing (CN)

(73) Assignees: Beijing JingDong ShangKe Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 53 days.

(21) Appl. No.: 17/042,018

(22) PCT Filed: Apr. 12, 2019

(86) PCT No.: PCT/CN2019/082567
§ 371 (c)(1),
(2) Date: Sep. 25, 2020

(87) PCT Pub. No.: WO2019/196947
PCT Pub. Date: Oct. 17, 2019

(65) Prior Publication Data
US 2021/0165494 A1    Jun. 3, 2021

(30) Foreign Application Priority Data
Apr. 13, 2018   (CN) .......................... 201810331949.8

(51) Int. Cl.
*G06F 3/01*   (2006.01)
*G06T 7/70*   (2017.01)
(Continued)

(52) U.S. Cl.
CPC .............. *G06F 3/017* (2013.01); *G06F 3/167* (2013.01); *G06K 9/6215* (2013.01); *G06T 7/70* (2017.01);
(Continued)

(58) Field of Classification Search
CPC .......... G06F 3/017; G06F 3/167; G06F 3/011; G06K 9/6215; G06T 7/70;
(Continued)

(56) References Cited

U.S. PATENT DOCUMENTS 10,269,344 B2 *   4/2019   Lee ...................... G06V 40/174
10,534,438 B2 *   1/2020   Klein .................... G06F 3/017
(Continued)

FOREIGN PATENT DOCUMENTS

CN   103152467   6/2013
CN   103616965   3/2014
(Continued)

OTHER PUBLICATIONS

International Search Report, issued in the corresponding PCT application No. PCT/CN2019/082567, dated Jul. 1, 2019, 8 pages.
(Continued)

*Primary Examiner* — Grant Sitta
(74) *Attorney, Agent, or Firm* — Hamre, Schumann, Mueller & Larson, P.C.

(57) ABSTRACT

A method for determining an electronic device, a system for determining an electronic device, a computer system, and a computer-readable storage medium, the method includes: acquiring a recognition result by recognizing a first action performed by an operating object through a first electronic
(Continued)

device (S201); and determining a second electronic device which is controllable by the first electronic device according to the recognition result (S202).

11 Claims, 11 Drawing Sheets

(51) Int. Cl.
*G06F 3/16* (2006.01)
*G06K 9/62* (2022.01)
*G06V 10/50* (2022.01)
*G06V 10/75* (2022.01)
*G06V 40/20* (2022.01)

(52) U.S. Cl.
CPC ............ *G06V 10/50* (2022.01); *G06V 10/758* (2022.01); *G06V 40/28* (2022.01); *G06T 2207/30196* (2013.01)

(58) Field of Classification Search
CPC .......... G06T 2207/30196; G06V 10/50; G06V 10/758; G06V 40/28; G06V 10/44; G06V 40/20
See application file for complete search history.

(56) References Cited

U.S. PATENT DOCUMENTS

| | | | | |
|---|---|---|---|---|
| 10,644,898 | B2* | 5/2020 | Yu | H04N 5/23203 |
| 10,846,864 | B2* | 11/2020 | Kim | G06F 3/017 |
| 2009/0150160 | A1* | 6/2009 | Mozer | G06F 3/0346 |
| | | | | 704/E15.001 |
| 2011/0109539 | A1* | 5/2011 | Wu | G06F 3/017 |
| | | | | 704/254 |
| 2011/0164163 | A1 | 7/2011 | Bilbrey et al. | |
| 2011/0313768 | A1* | 12/2011 | Klein | G06F 3/017 |
| | | | | 715/728 |
| 2012/0304067 | A1* | 11/2012 | Han | G06F 3/005 |
| | | | | 715/728 |
| 2013/0010207 | A1* | 1/2013 | Valik | G06F 3/0304 |
| | | | | 704/E21.001 |
| 2014/0184528 | A1 | 7/2014 | Chen et al. | |
| 2014/0300542 | A1 | 10/2014 | Jakubiak et al. | |
| 2016/0170493 | A1 | 6/2016 | Park | |
| 2018/0032144 | A1* | 2/2018 | Horowitz | G01S 3/00 |
| 2019/0019515 | A1* | 1/2019 | Kim | G10L 15/22 |

FOREIGN PATENT DOCUMENTS

| | | |
|---|---|---|
| CN | 104007865 | 8/2014 |
| CN | 104866083 | 8/2015 |
| CN | 105425954 | 3/2016 |
| CN | 107203756 | 9/2017 |
| CN | 107484072 | 12/2017 |
| EP | 3112983 | 1/2017 |
| JP | 2000-231427 | 8/2000 |
| JP | 2004-246856 | 9/2004 |
| JP | 2007-266772 | 10/2007 |
| JP | 2012-198608 | 10/2012 |
| JP | 2014-203090 | 10/2014 |
| WO | 2018-008218 | 1/2018 |

OTHER PUBLICATIONS

Chinese Office Action, issued in the corresponding Chinese Patent Application No. 201810331949.8, dated Nov. 9, 2020, 12 pages.
Japanese Office Action, issued in the corresponding Japanese Patent Application No. 2020-551794, dated Oct. 5, 2021, 8 pages.
Extended European Search Report, issued in the corresponding European patent application No. 19785227.0, dated Dec. 1, 2021, 8 pages.
Japanese Office Action, issued in the corresponding Japanese Patent Application No. 2020-551794, dated May 17, 2022, 6 pages.

* cited by examiner

METHOD, SYSTEM FOR DETERMINING ELECTRONIC DEVICE, COMPUTER SYSTEM AND READABLE STORAGE MEDIUM

CROSS-REFERENCE TO RELATED APPLICATION

This application claims priority to the Chinese Patent Application No. 201810331949.8, filed on Apr. 13, 2018, which is incorporated herein by reference in its entirety.

TECHNICAL FIELD

The present disclosure relates to a field of Internet technology; and particularly to a method and a system for determining an electronic device, a computer system, and a computer-readable storage medium.

BACKGROUND

Currently, before intelligent control is performed, it is generally necessary to firstly determine which devices are objects to be controlled.

In most of the methods for determining a device to be controlled in the related technology, a user transmits corresponding confirmation information to a control terminal in a contact manner (for example, a touch operation), and then the control terminal determines the device to be controlled according to the confirmation information.

With the development of intelligent homes, the contact manner may no longer be used to provide a better user experience. In order to overcome the above shortcomings, in some other related technologies, technical solutions for remotely determining a device to be controlled in a non-contact manner (for example, a voice operation) are further provided.

However, in a process of implementing the concept of the present disclosure, the inventors found that there are at least the following problems in the related technologies: the existing voice confirmation manner not only has a defect of inaccurate semantic understanding, but also has high requirements for distances and environmental noises, thereby resulting in restricted usage scenarios.

SUMMARY

In view of this, the present disclosure provides a method and a system for determining an electronic device, which determine a second electronic device which is controllable by a first electronic device according to a recognition result obtained by recognizing a first action performed by an operating object through the first electronic device, to solve the shortcomings that the existing voice manipulation manner not only has a defect of inaccurate semantic understanding, but also has high requirements for distances and environmental noises, thereby resulting in restricted usage scenarios.

An aspect of the present disclosure provides a method for determining an electronic device, comprising: acquiring a recognition result by recognizing a first action performed by an operating object through a first electronic device; and determining a second electronic device which is controllable by the first electronic device according to the recognition result.

According to an embodiment of the present disclosure, determining a second electronic device which is controllable by the first electronic device comprises: determining at least one candidate electronic device which is controllable by the first electronic device; determining a coordinate origin; determining at least one first position vector corresponding to each of the at least one candidate electronic device, which starts from the coordinate origin and ends with a position of the candidate electronic device itself; determining a second position vector starting from the coordinate origin and ending with a position at which the operating object is located after the operating object performs a second action; and determining the second electronic device from the at least one candidate electronic device based on the at least one first position vector and the second position vector.

According to an embodiment of the present disclosure, determining the second electronic device from the at least one candidate electronic device comprises: determining at least one first angle formed by all of the at least one first position vector and the same coordinate axis; determining a second angle formed by the second position vector and the same coordinate axis; calculating an angle difference between each of the at least one first angle and the second angle to obtain a corresponding at least one angle difference; and in a case that there is an angle difference in the at least one angle difference which is less than or equal to a predetermined angle, determining an electronic device in the at least one candidate electronic device, which corresponds to the angle difference less than or equal to the predetermined angle, as the second electronic device.

According to an embodiment of the present disclosure, the method for determining an electronic device further comprises: before determining the electronic device in the at least one candidate electronic device, which corresponds to the angle difference less than or equal to the predetermined angle, as the second electronic device, outputting name information of the corresponding electronic device; and in a case that the operating object performs a confirmation operation for the name information, determining the corresponding electronic device as the second electronic device.

According to an embodiment of the present disclosure, in a process of determining at least one candidate electronic device which is controllable by the first electronic device, for each electronic device in a target area, acquiring an image of the electronic device; calculating a first integral image of the image of the electronic device; acquiring at least one predetermined integral image, wherein the predetermined integral image is obtained by calculating a predetermined template image, and the predetermined template image is an image obtained through an electronic device which is controllable by the first electronic device; calculating a first similarity between the first integral image and each of the at least one predetermined integral image to obtain at least one first similarity; and in a case that there is a similarity in the at least one first similarity that satisfies a first similarity threshold, determining the electronic device as the candidate electronic device.

According to an embodiment of the present disclosure, the method for determining an electronic device further comprises: before determining the electronic device as the candidate electronic device, calculating a first histogram of the image corresponding to the electronic device; acquiring at least one predetermined histogram, wherein the predetermined histogram is obtained by calculating a predetermined template image; calculating a second similarity between the first histogram and each of the at least one predetermined histogram to obtain at least one second similarity; and in a case that there is a similarity in the at least one first similarity that satisfies the first similarity threshold and there is also a similarity in the at least one second similarity that satisfies a second similarity threshold, determining the electronic device as the candidate electronic device.

According to an embodiment of the present disclosure, the method for determining an electronic device further comprises: after determining the second electronic device which is controllable by the first electronic device, receiving, by the second electronic device, voice information of a user and making a response to the voice information of the user.

Another aspect of the present disclosure provides a system for determining an electronic device, comprising: a first acquisition apparatus configured to acquire a recognition result by recognizing a first action performed by an operating object through a first electronic device; and a first determination apparatus configured to determine a second electronic device which is controllable by the first electronic device according to the recognition result.

According to an embodiment of the present disclosure, the first determination apparatus comprises: a first determination unit configured to determine at least one candidate electronic device which is controllable by the first electronic device; a second determination unit configured to determine a coordinate origin; a third determination unit configured to determine at least one first position vector corresponding to each of the at least one candidate electronic device, which starts from the coordinate origin and ends with a position of the candidate electronic device itself; a fourth determination unit configured to determine a second position vector starting from the coordinate origin and ending with a position at which the operating object is located after the operating object performs a second action; and a fifth determination unit configured to determine the second electronic device from the at least one candidate electronic device based on the at least one first position vector and the second position vector.

According to an embodiment of the present disclosure, the fifth determination unit comprises: a first determination sub-unit configured to determine at least one first angle formed by all of the at least one first position vector and the same coordinate axis; a second determination sub-unit configured to determine a second angle formed by the second position vector and the same coordinate axis; a calculation sub-unit configured to calculate an angle difference between each of the at least one first angle and the second angle to obtain a corresponding at least one angle difference; and a third determination sub-unit configured to, in a case that there is an angle difference in the at least one angle difference which is less than or equal to a predetermined angle, determine an electronic device in the at least one candidate electronic device, which corresponds to the angle difference less than or equal to the predetermined angle, as the second electronic device.

According to an embodiment of the present disclosure, the system for determining an electronic device further comprises: an output apparatus configured to, before determining the electronic device in the at least one candidate electronic device, which corresponds to the angle difference less than or equal to the predetermined angle, as the second electronic device, output name information of the corresponding electronic device; and a second determination apparatus configured to, in a case that the operating object performs a confirmation operation for the name information, determine the corresponding electronic device as the second electronic device.

According to an embodiment of the present disclosure, in a process of determining at least one candidate electronic device which is controllable by the first electronic device, for each electronic device in a target area, the first determination unit is configured to: acquire an image of the electronic device; calculate a first integral image of the image of the electronic device; acquire at least one predetermined integral image, wherein the predetermined integral image is obtained by calculating a predetermined template image, and the predetermined template image is an image obtained through an electronic device which is controllable by the first electronic device; calculate a first similarity between the first integral image and each of the at least one predetermined integral image to obtain at least one first similarity; and in a case that there is a similarity in the at least one first similarity that satisfies a first similarity threshold, determine the electronic device as the candidate electronic device.

According to an embodiment of the present disclosure, the system for determining an electronic device further comprises: a first calculation apparatus configured to, before determining the electronic device as the candidate electronic device, calculate a first histogram of the image corresponding to the electronic device; a second acquisition apparatus configured to acquire at least one predetermined histogram, wherein the predetermined histogram is obtained by calculating a predetermined template image; a second calculation apparatus configured to calculate a second similarity between the first histogram and each of the at least one predetermined histogram to obtain at least one second similarity; and a third determination apparatus configured to, in a case that there is a similarity in the at least one first similarity that satisfies the first similarity threshold and there is also a similarity in the at least one second similarity that satisfies a second similarity threshold, determine the electronic device as the candidate electronic device.

Yet another aspect of the present disclosure provides a device for determining an electronic device, comprising: a collection apparatus, a recognition apparatus, and a processing apparatus, wherein the collection apparatus is configured for a first action performed by an operating object; the recognition apparatus is configured to recognize the first action to acquire a recognition result; and the processing apparatus is configured to determine a second electronic device which is controllable according to the recognition result.

According to an embodiment of the present disclosure, the device for determining an electronic device further comprises: a signal transmission apparatus configured to transmit a signal to the second electronic device which is controllable.

Yet another aspect of the present disclosure provides a system for determining an electronic device, comprising: at least one first electronic device; and at least one second electronic device, wherein the at least one first electronic device is configured to recognize a first action performed by an operating object to acquire a recognition result, and determine a second electronic device which is controllable by the first electronic device according to the recognition result.

Yet another aspect of the present disclosure provides a computer system, comprising: one or more processors; and a computer-readable storage medium having stored thereon one or more programs, wherein the one or more programs, when executed by the one or more processors, cause the one or more processors to implement the method for determining an electronic device according to any of the above embodiments.

Yet another aspect of the present disclosure provides a computer-readable storage medium having stored thereon executable instructions which, when executed by a processor, cause the processor to implement the method for determining an electronic device according to any of the above embodiments.

With the embodiments of the present disclosure, since the technical solution of determining a second electronic device which may be controlled by a first electronic device based on a recognition result obtained by recognizing a first action performed by an operating object through the first electronic device, which at least partially solves the technical problem that the existing voice manipulation manner not only has a defect of inaccurate semantic understanding, but also has high requirements for distances and environmental noises, thereby resulting in restricted usage scenarios, and therefore may realize a technical effect of helping users determine the second electronic device in a more natural manner in a less restrictive usage scenario.

BRIEF DESCRIPTION OF THE DRAWINGS

Through the following description of the embodiments of the present disclosure with reference to the accompanying drawings, the above and other purposes, features, and advantages of the present disclosure will be more apparent. In the accompanying drawings.

DETAILED DESCRIPTION OF EMBODIMENTS

Figure 1:
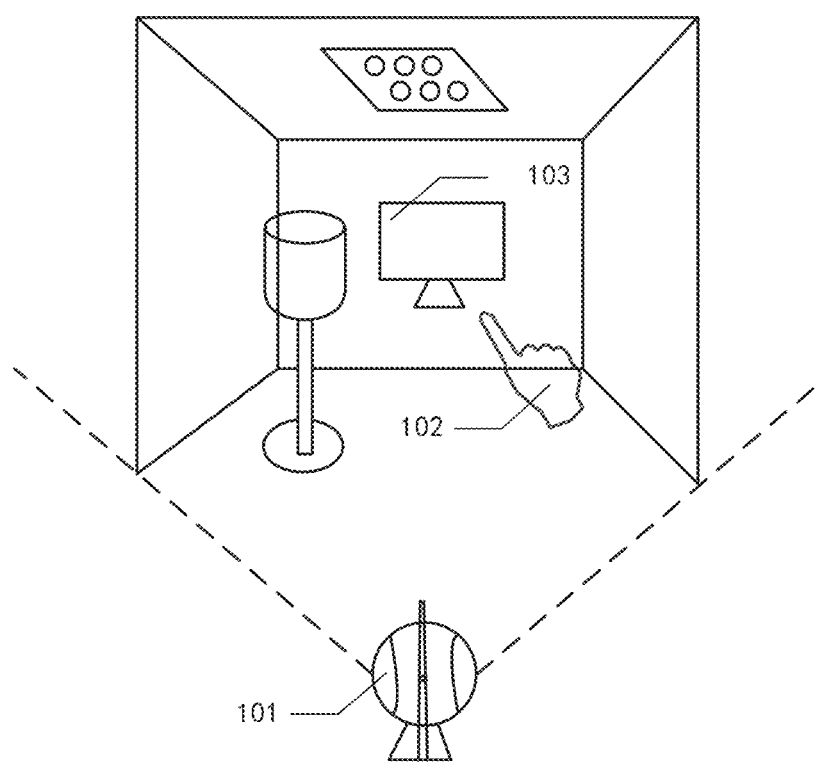
FIG. 1 schematically illustrates an application scenario of a method and a system for determining an electronic device according to an embodiment of the present disclosure.

Hereinafter, embodiments of the present disclosure will be described with reference to the accompanying drawings. However, it should be understood that these descriptions are only exemplary and are not intended to limit the scope of the present disclosure. In addition, in the following description, descriptions of well-known structures and technologies are omitted to avoid unnecessarily obscuring the concept of the present disclosure.

The terms used here are only for describing specific embodiments, and are not intended to limit the present disclosure. The terms "comprising", "including", etc. used herein indicate existence of the described features, steps, operations and/or components, but do not exclude existence or addition of one or more other features, steps, operations or components.

All terms (comprising technical and scientific terms) used herein have the meanings commonly understood by those skilled in the art, unless otherwise defined. It should be noted that the terms used here should be interpreted as having meanings consistent with the context of this specification, and should not be interpreted in an idealized or overly rigid manner.

In a case of using an expression similar to "at least one of A, B and C, etc.", generally speaking, it should be interpreted according to the meaning of the expression commonly understood by those skilled in the art (for example, "a system having at least one of A, B and C" shall comprise, but not limited to, a system having A alone, a system having B alone, a system having C alone, a system having A and B, a system having A and C, a system having B and C, and/or a system having A, B, C, etc.) In a case of using an expression similar to "at least one of A, B or C, etc.", generally speaking, it should be interpreted according to the meaning of the expression commonly understood by those skilled in the art (for example, "a system having at least one of A, B or C" shall comprise, but not limited to, a system having A alone, a system having B alone, a system having C alone, a system having A and B, a system having A and C, a system having B and C, and/or a system having A, B, C, etc.) It should be understood by those skilled in the art that any transitional conjunctions and/or phrases representing two or more optional items, whether in the description, claims or accompanying drawings, should essentially be understood to give possibilities of comprising one of these items, any of these items, or two of these items. For example, the phrase "A or B" should be understood to give possibilities of comprising "A" or "B", or "A and B".

The embodiments of the present disclosure provide a method for determining an electronic device. The method for determining an electronic device may comprise: acquiring a recognition result by recognizing a first action performed by an operating object through a first electronic device; and determining a second electronic device which is controllable by the first electronic device according to the recognition result.

FIG. 1 schematically illustrates an application scenario of a method and a system for determining an electronic device according to an embodiment of the present disclosure. It should be illustrated that FIG. 1 only illustrates an example of an application scenario in which the embodiments of the present disclosure may be applied to help those skilled in the art understand the technical content of the present disclosure, but it does not mean that the embodiments of the present disclosure may not be used for other devices, systems, environments or scenarios.

In the application scenario of the embodiment of the present disclosure, as shown in FIG. 1, it is assumed that the first electronic device is a camera 101, the operating object is a human hand 102, and the second electronic device is a television 103. After a user may perform a first action with the human hand 102, the camera 101 may recognize the first action performed with the human hand 102 and obtain a recognition result. The camera 101 may determine the television 103 which is controllable by the camera 101 according to the recognition result. Further, the camera 101 may further control the television 103, for example, turn on the television 103, turn off the television 103, etc.

In other words, in the application scenario of the embodiment of the present disclosure, the second electronic device which is controllable by the first electronic device may be determined based on the recognition result obtained by recognizing the first action performed by the operating object through the first electronic device, which may solve the shortcomings that the existing voice manipulation manner not only has a defect of inaccurate semantic understanding, but also has high requirements for distances and environmental noises, thereby resulting in restricted usage scenarios.

Figure 2:
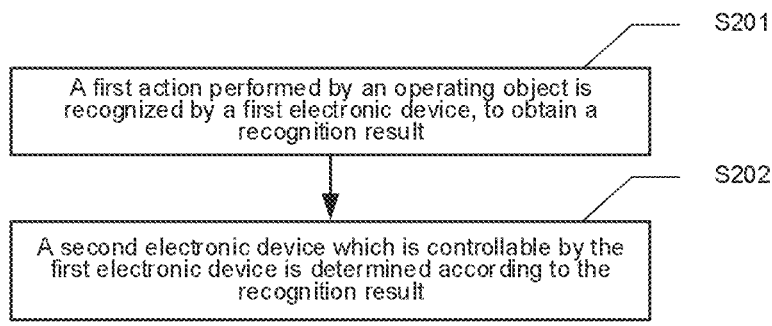
FIG. 2 schematically illustrates a flowchart of a method for determining an electronic device according to an embodiment of the present disclosure.

FIG. 2 schematically illustrates a flowchart of a method for determining an electronic device according to an embodiment of the present disclosure.

As shown in FIG. 2, the method for determining an electronic device may comprise operations S201 and S202 as follows.

In operation S201, a first action performed by an operating object is recognized by a first electronic device, to obtain a recognition result.

In operation S202, a second electronic device which is controllable by the first electronic device is determined according to the recognition result.

The method for determining an electronic device according to the present disclosure may be applied to the first electronic device, which may comprise, but not limited to, a mobile phone, a desktop computer, a notebook computer, a tablet computer, a camera, etc., and may communicate with the second electronic device, for example, control the second electronic device.

According to an embodiment of the present disclosure, the first electronic device may have a recognition function. Specifically, the first electronic device may recognize at least one electronic device in a scenario, and then recognize at least one candidate electronic device which is controllable by the first electronic device from the at least one electronic device, wherein the at least one candidate electronic device which is controllable by the first electronic device may comprise the second electronic device.

In an embodiment of the present disclosure, the first electronic device may further recognize the first action performed by the operating object, so as to obtain the recognition result. Here, the first electronic device is not in contact with the operating object, and the first action may be performed by the operating object in a space where the operating object itself and the first electronic device are commonly located.

According to an embodiment of the present disclosure, when the recognition result of the first electronic device characterizes that a certain electronic device is a candidate second electronic device, the first electronic device may transmit second confirmation information to the candidate second electronic device; and in response to receiving the second confirmation information, the candidate second electronic device may prompt the operating object, for example, in a form of sound and light. At this time, the first electronic device may receive an action of the operating object (for example, collect the action of the operating object when the first electronic device detects the prompt in the form of sound and light, or collect the action of the operating object at a set time threshold after the first electronic device transmits the second confirmation information) again, and if the action of the operating object characterizes "confirmation" information, for example, a "√" action, the candidate second electronic device is used as the second electronic device.

It should be illustrated that the above operating object may comprise the user's limb, hand, foot, etc., or may also comprise an object manipulated by the user. Correspondingly, the first action performed by the operating object may be an action performed by the user's limb, hand, foot, etc., or may also be an action performed by the object manipulated by the user.

Hereinafter, by taking the operating object being a human hand as an example, a solution of recognizing an action performed by the human hand through the first electronic device will be described in detail.

According to an embodiment of the present disclosure, before the action of the human hand is recognized, a gesture may be firstly recognized, for example, the gesture may be recognized using a skin color-based gesture segmentation method. Specifically, the skin color-based gesture segmentation method is used for recognition using a difference between a skin color and a background color, and is then used for further recognition using an unique edge characteristics of the gesture (for example, a contour of the human hand), so as to recognize and determine the gesture. Further, after the gesture is determined, the first electronic device (for example, a camera) may track a movement of the human hand using a Meanshift algorithm, so as to determine a manipulation instruction using a trajectory of the movement of the human hand.

According to an embodiment of the present disclosure, a recognition result may be obtained after the first electronic device recognizes the first action performed by the operating object. Here, the recognition result may comprise a manipulation instruction corresponding to the first action, and the recognition result may be obtained based on a trajectory of the movement of the recognized first action, or may also be obtained based on a final presentation gesture of the recognized first action, which is not limited here. Further, the first electronic device may acquire the recognition result, and determine the second electronic device which is controllable by the first electronic device according to the recognition result.

According to an embodiment of the present disclosure, the first electronic device may further control the second electronic device according to the recognition result after the second electronic device is determined. For example, if the first action is drawing a circle by the operating object in the air, the first action may be used by the first electronic device to determine the second electronic device and control the second electronic device to sleep; and if the first action is drawing an "X" shape by the operating object in the air, the first action may be used by the first electronic device to determine the second electronic device and control the second electronic device to increase a volume.

It should be illustrated that in the embodiment of the present disclosure, the first electronic device may be referred to as a master electronic device, and the second electronic device may be referred to as a slave electronic device. Here, the first electronic device in the embodiment of the present disclosure may control an electronic device (for example, the second electronic device) to perform operations, or perform operations by itself; and the second electronic device in the embodiment of the present disclosure may be controlled by the first electronic device, or may initiate actions by itself, for example, playing music regularly.

Differently from the embodiment of the present disclosure, in the current related technology, a user transmits corresponding confirmation information to a control terminal in a contact manner (for example, a touch operation), and then the control terminal determines a device to be controlled according to the confirmation information. However, the contact manner may not be used to provide a better user experience. In some other related technologies, technical solutions for remotely determining a device to be controlled in a non-contact manner (for example, a voice operation) are further provided. However, the existing voice confirmation manner not only has a defect of inaccurate semantic understanding, but also has high requirements for distances and environmental noises, thereby resulting in restricted usage scenarios. In addition, in some other related technologies, there are further provided gesture recognition technologies, but the current gesture recognition technologies are only applicable to certain specific usage scenarios, for example, scenarios such as somatosensory games and VR device control etc., and these technologies are limited to interaction between a user and a single device to be operated, and may not involve a third type of device interaction.

According to the embodiment of the present disclosure, the first electronic device determines the second electronic device which is controllable by the first electronic device based on the recognition result obtained by recognizing the first action performed by the operating object through the first electronic device, which may help users determine the second electronic device in a more natural manner in a less restrictive usage scenario, and may solve the shortcomings that the existing voice manipulation manner not only has a defect of inaccurate semantic understanding, but also has high requirements for distances and environmental noises, thereby resulting in restricted usage scenarios.

It should be illustrated that in the embodiment of the present disclosure, an action operation mode may further be combined with a voice operation mode, so that the present disclosure may be applied to more scenarios.

In one embodiment, description will be made by taking an intelligent speaker as an example. The intelligent speaker has an operation mode and a sleep mode. When the first electronic device confirms that the second electronic device is an intelligent speaker through the action of the operating object and wakes up the intelligent speaker (the intelligent speaker changes from the sleep mode to the operation mode), the operating object may perform voice interaction with the intelligent speaker, which may not only ensure the accuracy of the confirmed second electronic device, but also may not influence a normal use of the second electronic device.

In another embodiment, when it is inconvenient to determine which electronic device is the second electronic device by means of voice etc., the second electronic device may be determined through an action of the operating object. For example, when two intelligent air conditioners that may perform voice interaction are operating in a room, if the operating object emits a voice "set a temperature at 25 degrees", it is not convenient to determine which intelligent air conditioner performs the operation. At this time, the two intelligent air conditioners may prompt the operating object to make confirmation by means of sound and light. For example, the operating object points its finger to an intelligent air conditioner of which a temperature parameter is desired to be reset, the first electronic device determines the corresponding intelligent air conditioner to reset the temperature parameter based on the action of the operating object, and transmits information to the intelligent air conditioner.

In another embodiment, description will be made still by taking an intelligent speaker as an example. When the recognition result of the first electronic device characterizes that the intelligent speaker is a candidate second electronic device, the first electronic device may transmit second confirmation information to the candidate second electronic device; and in response to receiving the second confirmation information, the intelligent speaker may transmit a sound and light prompt to the operating object, for example, transmit voice information "are you going to wake up Dingdong?" At this time, the intelligent speaker may enter a standby mode and receive the second confirmation information from the operating object. For example, if the operating object transmits voice information "yes", the intelligent speaker determines itself to be the second electronic device and may transmit information to the first electronic device. In this way, the action operation may be combined with the voice operation etc. to improve the user experience.

The method shown in FIG. 2 will be further described with reference to FIGS. 3A to 3G in conjunction with specific embodiments.

Figure 3A:
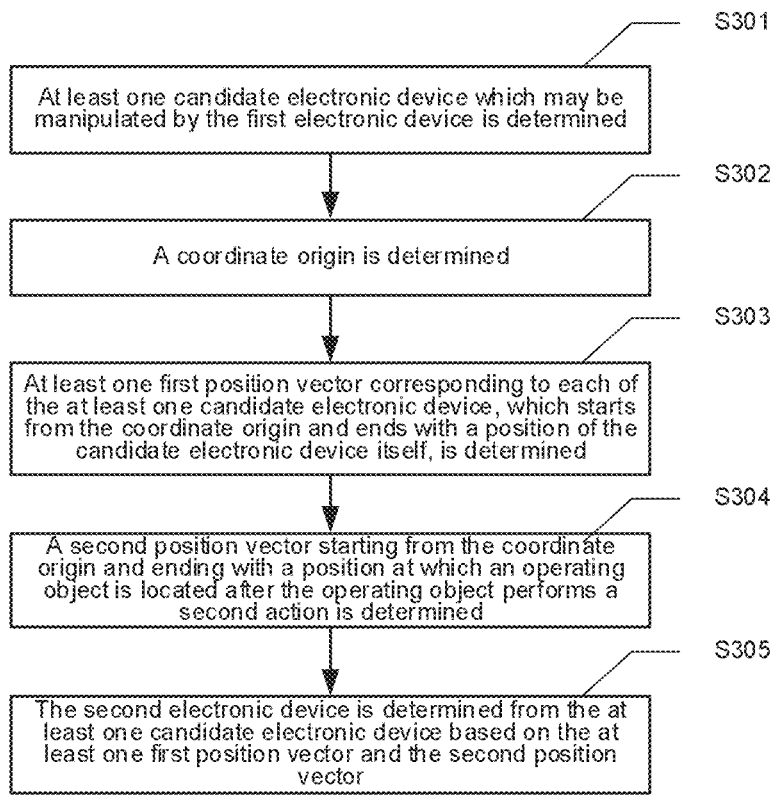
FIG. 3A schematically illustrates a flowchart of determining second electronic device according to an embodiment of the present disclosure.

FIG. 3A schematically illustrates a flowchart of determining second electronic device according to an embodiment of the present disclosure.

As shown in FIG. 3A, determining an electronic device to be controlled which is controllable by a first electronic device may comprise operations S301 to S305 as follows.

In operation S301, at least one candidate electronic device which may be manipulated by the first electronic device is determined.

In operation S302, a coordinate origin is determined.

In operation S303, at least one first position vector corresponding to each of the at least one candidate electronic device, which starts from the coordinate origin and ends with a position of the candidate electronic device itself, is determined.

In operation S304, a second position vector starting from the coordinate origin and ending with a position at which an operating object is located after the operating object performs a second action is determined.

In operation S305, the second electronic device is determined from the at least one candidate electronic device based on the at least one first position vector and the second position vector.

In an embodiment of the present disclosure, before the second electronic device is determined, at least one candidate electronic device which may be manipulated by the first electronic device may be firstly determined, and then the second electronic device may be determined from the at least one candidate electronic device.

It should be illustrated that the electronic device which collects the first action and the second action comprises various sensors which may be used for gesture recognition, comprising, but not limited to, a camera, a lidar, a proximity sensor, an infrared sensor, etc., wherein the camera may comprise a monocular camera, a binocular camera, etc.

According to an embodiment of the present disclosure, the first electronic device may establish a three-dimensional coordinate system based on the recognized at least one candidate electronic device and the operating object, and determine an origin of the three-dimensional coordinate system. Since there is a certain distance between a position of each candidate electronic device and the coordinate origin, a first position vector starting from the coordinate origin and ending with a position of each candidate electronic device itself may be determined, so that at least one first position vector corresponding to each of the at least one candidate electronic device may be determined. Similarly, since there is also a certain distance between the position at which the operating object is located after the second action is performed by the operating object and the coordinate origin, a second position vector starting from the coordinate origin and ending with the position at which the operating object is located after the second action is performed by the operating object may be determined. In this way, the second electronic device may be determined from the at least one candidate electronic device based on the at least one first position vector and the second position vector.

It should be illustrated that in the embodiment of the present disclosure, the second action performed by the operating object may be an action performed by the user's limb, hand, foot, etc., or an action performed by the object manipulated by the user. For example, when the operating object is a human hand, the second action performed by the operating object may be an action of the human hand pointing to an electronic device to be controlled. In addition, the second action may be the same action as the first action, that is, both the first action and the second action may be used to determine the second electronic device; the second action may also be an action different from the first action, for example, the first action may be used to instruct the first electronic device to control the second electronic device, and the second action may be used to instruct the first electronic device to determine the second electronic device.

With the embodiment of the present disclosure, the second electronic device is determined from the at least one candidate electronic device based on the at least one first position vector and the second position vector, which may not only improve the accuracy of determining the second electronic device, but also may enhance the user experience.

Figure 3B:
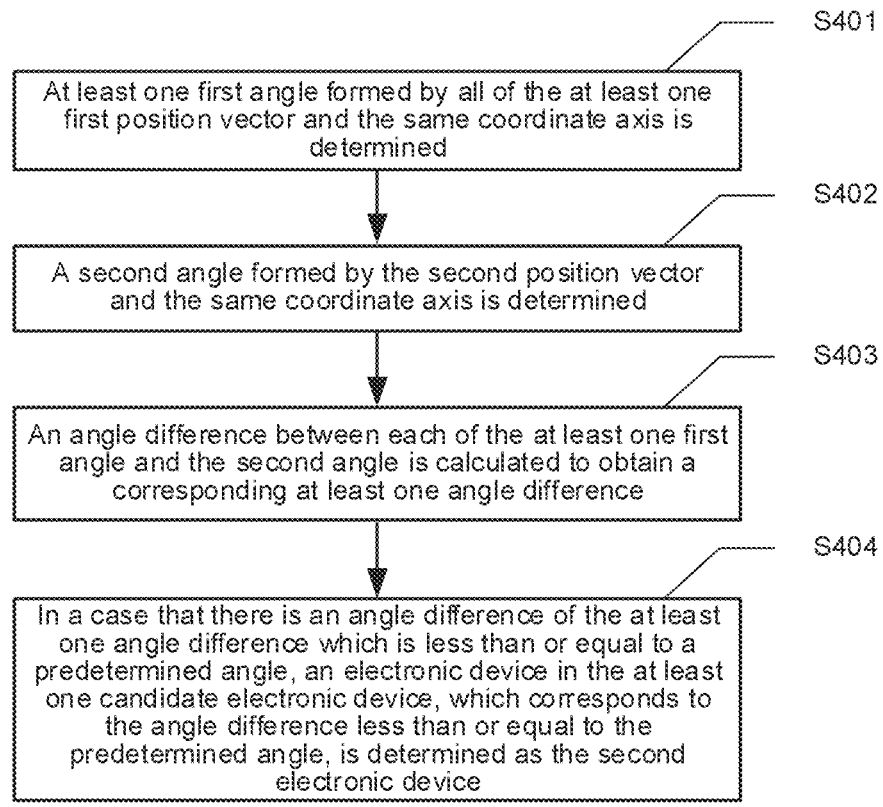
FIG. 3B schematically illustrates a flowchart of determining a second electronic device according to another embodiment of the present disclosure.

FIG. 3B schematically illustrates a flowchart of determining a second electronic device according to another embodiment of the present disclosure.

As shown in FIG. 3B, determining a second electronic device from at least one candidate electronic device may comprise operations S401 to S404 as follows.

In operation S401, at least one first angle formed by all of the at least one first position vector and the same coordinate axis is determined.

In operation S402, a second angle formed by the second position vector and the same coordinate axis is determined.

In operation S403, an angle difference between each of the at least one first angle and the second angle is calculated to obtain a corresponding at least one angle difference.

In operation S404, in a case that there is an angle difference of the at least one angle difference which is less than or equal to a predetermined angle, an electronic device of the at least one candidate electronic device, which corresponds to the angle difference less than or equal to the predetermined angle, is determined as the second electronic device.

In an embodiment of the present disclosure, at least one first angle formed by all of the at least one first position vector and a certain coordinate axis may be determined according to the determined at least one first position vector, wherein the coordinate axis may be, for example, an x axis, a y axis, or a z axis, etc. A second angle formed by the second position vector and the certain coordinate axis may further be determined according to the second position vector. It should be understood that the first angle and the second angle are angles formed by the first position vector and the second position vector and the same coordinate axis, respectively.

According to an embodiment of the present disclosure, an angle difference between each of the at least one first angle and the second angle may be calculated respectively, so that at least one angle difference may be obtained. Each of the at least one angle difference is compared with the predetermined angle respectively, and in a case that there is an angle difference in the at least one angle difference which is less than or equal to the predetermined angle, a candidate electronic device which corresponds to the angle difference less than or equal to the predetermined angle may be determined as the second electronic device.

With the embodiment of the present disclosure, the electronic device in the at least one candidate electronic device which corresponds to the angle difference less than or equal to the predetermined angle is determined as the second electronic device, which may further improve the accuracy of determining the second electronic device.

Figure 3C:
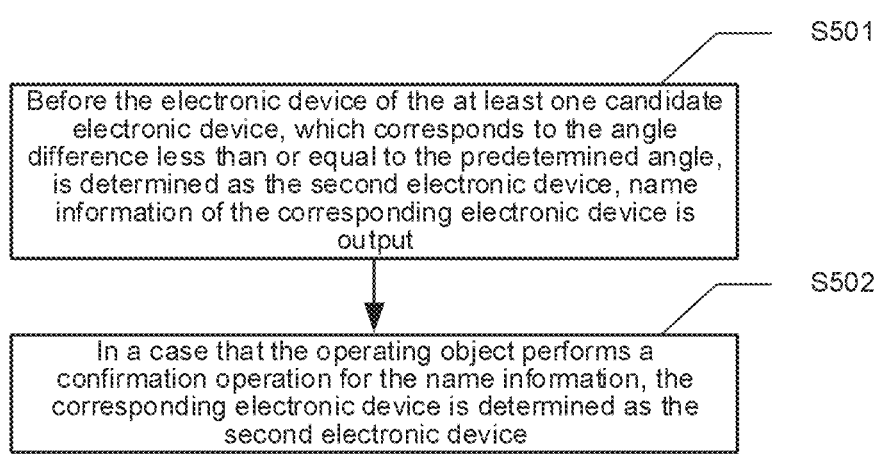
FIG. 3C schematically illustrates a flowchart of a method for determining an electronic device according to another embodiment of the present disclosure.

FIG. 3C schematically illustrates a flowchart of a method for determining an electronic device according to another embodiment of the present disclosure.

As shown in FIG. 3C, the method for determining an electronic device may further comprise operations S501 and S502 as follows.

In operation S501, before the electronic device in the at least one candidate electronic device, which corresponds to the angle difference less than or equal to the predetermined angle, is determined as the second electronic device, name information of the corresponding electronic device is output.

In operation S502, in a case that the operating object performs a confirmation operation for the name information, the corresponding electronic device is determined as the second electronic device.

In an embodiment of the present disclosure, in order to further ensure that the electronic device in the at least one candidate electronic device which corresponds to the angle difference less than or equal to the predetermined angle is the second electronic device which is desired to be determined by the user, before the corresponding electronic device is determined as the second electronic device, the name information of the corresponding electronic device may be output. Specifically, the name information may be broadcasted by voice, or the name information may be displayed on a display screen, or the name information may be displayed by holographic projection.

According to the embodiment of the present disclosure, the user may perform a corresponding operation according to the name information output by the first electronic device. If the name information is name information corresponding to the second electronic device which is desired to be determined by the user through the first electronic device, the user may feed back a confirmation operation performed for the name information to the first electronic device, and after the first electronic device receives the confirmation operation, the first electronic device may determine the corresponding electronic device as the second electronic device. Here, the confirmation operation may be an action performed by the operating object, and the first electronic device receiving the confirmation operation may be recognizing an action performed by the operating object.

With the embodiment of the present disclosure, in a case that the confirmation operation performed by the operating object for the name information is received, the electronic device in the at least one candidate electronic device which corresponds to the angle difference less than or equal to the predetermined angle is determined as the second electronic device, which may further improve the accuracy of the second electronic device which is desired to be determined by the user.

As an alternative embodiment, in a process of determining the at least one candidate electronic device which is controllable by the first electronic device, for each electronic device in a target area, an image of the electronic device is acquired; a first integral image of the image of the electronic device is calculated; at least one predetermined integral image is acquired, wherein the predetermined integral image is obtained by calculating a predetermined template image, and the predetermined template image is an image obtained through the electronic device which is controllable by the first electronic device; a first similarity between the first integral image and each of the at least one predetermined integral image is calculated to obtain at least one first similarity; and in a case that there is a similarity in the at least one first similarity that satisfies a first similarity threshold, the electronic device is determined as the candidate electronic device.

Figure 3D:
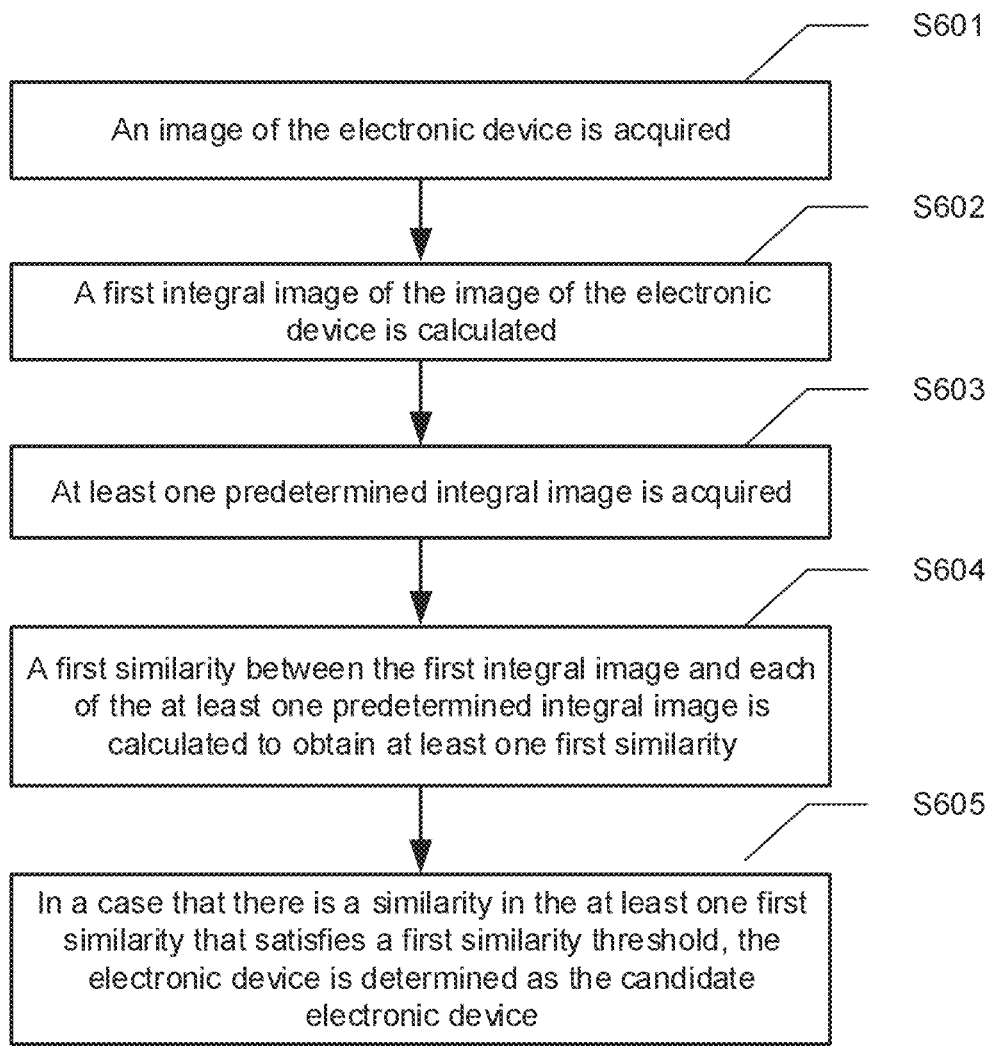
FIG. 3D schematically illustrates a flowchart of determining a candidate electronic device according to an embodiment of the present disclosure.

FIG. 3D schematically illustrates a flowchart of determining a candidate electronic device according to an embodiment of the present disclosure.

As shown in FIG. 3D, in a process of determining the at least one candidate electronic device which is controllable by the first electronic device, for each electronic device in the target area, operations S601 to S605 may be performed as follows.

In operation S601, an image of the electronic device is acquired.

In operation S602, a first integral image of the image of the electronic device is calculated.

In operation S603, at least one predetermined integral image is acquired, wherein the predetermined integral image is obtained by calculating a predetermined template image, and the predetermined template image is an image obtained through the electronic device which is controllable by the first electronic device.

In operation S604, a first similarity between the first integral image and each of the at least one predetermined integral image is calculated to obtain at least one first similarity.

In operation S605, in a case that there is a similarity in the at least one first similarity that satisfies a first similarity threshold, the electronic device is determined as the candidate electronic device.

In an embodiment of the present disclosure, the target area may comprise an area which may be recognized by the first electronic device. For example, when the first electronic device is a camera, the target area may comprise an area which may be scanned by the camera.

According to an embodiment of the present disclosure, the first electronic device may recognize a part of electronic devices in the target area, or may also recognize all the electronic devices in the target area, wherein the electronic devices in the target area may comprise electronic devices which is controllable by the first electronic device, or may also comprise electronic devices which is not controllable by the first electronic device.

According to an embodiment of the present disclosure, for each of the above electronic devices, the first electronic device may acquire an image of the electronic device, wherein the image may be obtained by scanning the electronic device through the first electronic device. A first integral image of the image of the electronic device is calculated, wherein the first integral image may comprise a first direction integral image, or may also comprise a first direction integral image and a first color integral image.

In an embodiment of the present disclosure, at least one predetermined integral image pre-stored in a master control electronic device may be acquired, wherein the predetermined integral image may be obtained by calculating a predetermined template image, and the predetermined integral image may comprise a predetermined direction integral image, or may also comprise a predetermined direction integral image and a predetermined color integral image. The above predetermined template image may be pre-stored in the first electronic device, and the predetermined template image may also be an image obtained through an electronic device which is controllable by the first electronic device. For example, the predetermined template image may be obtained by scanning the electronic device which is controllable by the first electronic device through the first electronic device.

Further, a first similarity between the first integral image and each of the at least one predetermined integral image is calculated to obtain at least one first similarity. Specifically, a third similarity between the first direction integral image and each of the at least one predetermined direction integral image may be calculated; or the third similarity between the first direction integral image and each of the at least one predetermined direction integral image and a fourth similarity between the first color integral image and each of the at least one predetermined color integral image may also be calculated.

Detecting whether there is a similarity in the at least one first similarity that satisfies a first similarity threshold may be detecting whether there is a similarity in the at least one third similarity that satisfies a third similarity threshold; or may also be determining whether there is a similarity in the at least one third similarity that satisfies the third similarity threshold, and determining whether there is a similarity in the at least one fourth similarity that satisfies a fourth similarity threshold.

In a case that there is a similarity in the at least one first similarity that satisfies the first similarity threshold, the electronic device is determined as the candidate electronic device. In other words, the electronic device may be determined as the candidate electronic device in a case that there is a similarity in the at least one third similarity that satisfies the third similarity threshold; or the electronic device may be determined as the candidate electronic device in a case that there is a similarity in the at least one third similarity that satisfies the third similarity threshold and there is a similarity in the at least one fourth similarity that satisfies the fourth similarity threshold.

With the embodiment of the present disclosure, in a case that there is a similarity in the at least one first similarity that satisfies the first similarity threshold, the electronic device is determined as the candidate electronic device, so as to obtain at least one candidate electronic device, so that the first electronic device may determine the second electronic device which is desired to be determined by the user from the at least one candidate electronic device.

Figure 3E:
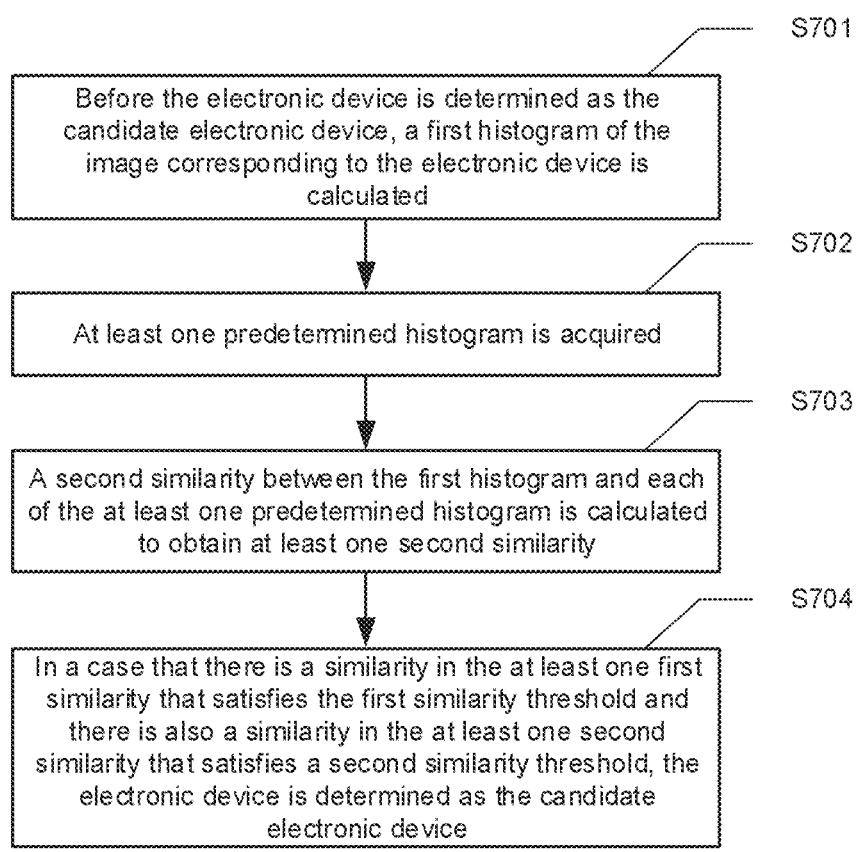
FIG. 3E schematically illustrates a flowchart of a method for determining an electronic device according to another embodiment of the present disclosure.

FIG. 3E schematically illustrates a flowchart of a method for determining an electronic device according to another embodiment of the present disclosure.

As shown in FIG. 3E, the method for determining an electronic device may further comprise operations S701 to S704 as follows.

In operation S701, before the electronic device is determined as the candidate electronic device, a first histogram of the image corresponding to the electronic device is calculated.

In operation S702, at least one predetermined histogram is acquired, wherein the predetermined histogram is obtained by calculating a predetermined template image.

In operation S703, a second similarity between the first histogram and each of the at least one predetermined histogram is calculated to obtain at least one second similarity.

In operation S704, in a case that there is a similarity in the at least one first similarity that satisfies the first similarity threshold and there is also a similarity in the at least one second similarity that satisfies a second similarity threshold, the electronic device is determined as the candidate electronic device.

In the embodiment of the present disclosure, in order to further ensure the accuracy that the determined candidate electronic device is an electronic device which may be controlled by the first electronic device, before the electronic device is determined as the candidate electronic device, a first histogram of an image corresponding to the electronic device may further be calculated. Here, the first histogram may comprise a first direction histogram, or may also comprise a first direction histogram and a first color histogram.

According to an embodiment of the present disclosure, at least one predetermined histogram pre-stored in the first electronic device may be acquired, wherein the predetermined histogram may be obtained by calculating a predetermined template image, and the predetermined histogram may comprise a predetermined direction histogram, or may also comprise a predetermined direction histogram and a predetermined color histogram.

Further, at least one first similarity may be obtained by calculating a first similarity between the first histogram and each of the at least one predetermined histogram. Specifically, a fifth similarity between the first direction histogram and each of the at least one predetermined direction histogram may be calculated; or the fifth similarity between the first direction histogram and each of the at least one predetermined direction histogram and a sixth similarity between the first color histogram and each of the at least one predetermined color histogram may also be calculated.

Detecting whether there is a similarity in the at least one second similarity that satisfies a second similarity threshold may be detecting whether there is a similarity in the at least one fifth similarity that satisfies a fifth similarity threshold; or may also be detecting whether there is a similarity in the at least one fifth similarity that satisfies the fifth similarity threshold and determining whether there is a similarity in the at least one sixth similarity that satisfies a sixth similarity threshold.

Further, in a case that there is a similarity in the at least one first similarity that satisfies the first similarity threshold and there is a similarity in the at least one second similarity that satisfies the second similarity threshold, the electronic device is determined as the candidate electronic device. In other words, the electronic device may be determined as the candidate electronic device in a case that there is a similarity in the at least one third similarity that satisfies the third similarity threshold and there is a similarity in the at least one fifth similarity that satisfies the fifth similarity threshold; or the electronic device may be determined as the candidate electronic device in a case that there is a similarity in the at least one third similarity that satisfies the third similarity threshold, there is a similarity in the at least one fourth similarity that satisfies the fourth similarity threshold, there is a similarity in the at least one fifth similarity that satisfies the fifth similarity threshold, and there is a similarity in the at least one sixth similarity that satisfies the sixth similarity threshold.

The embodiments of the present disclosure will be described below by taking the first electronic device being a camera as an example.

It is assumed that the first electronic device is a camera which stores information of images (also referred to as predetermined template images) at different angles of all electronic devices which is controllable by the camera. In addition, the camera may scan electronic devices in a target area, and images of the electronic devices in the target area which are acquired by the camera may be referred to as pre-processed images. Here, the camera may recognize the electronic devices in the target area through a similarity recommendation algorithm, and determine a group of candidate frames in a short time. Based thereon, a first integral image of a pre-processed image may be compared with a predetermined integral image of a predetermined template image to determine a similarity therebetween using a statistical matching method, so as to realize an object recognition function. Specific steps are as follows: a. calculating a first direction integral image and a first color integral image of the pre-processed image and comparing them with a predetermined direction integral image and a predetermined color integral image of the predetermined template image; b. obtaining a set of candidate frames of similar images through a similarity recommendation algorithm, and calculating a first direction histogram and a first color histogram of each candidate frame, wherein the candidate frame may be an image of an electronic device corresponding to a similarity in at least one similarity that satisfies a first similarity threshold in the above embodiment; and c. calculating a second similarity between a first histogram in each candidate frame and the predetermined histogram of the predetermined template image, and if the second similarity reaches a second similarity threshold, determining that the matching is successful.

It should be understood that, all electronic devices in a captured picture which are controllable by the first electronic device may be recognized based on the above embodiment.

With the embodiment of the present disclosure, in a case that the first similarity satisfies the first similarity threshold and the second similarity also satisfies the second similarity threshold, the electronic device is determined as one of the candidate electronic devices, which may improve the accuracy of each of the determined candidate electronic devices.

Figure 3F:
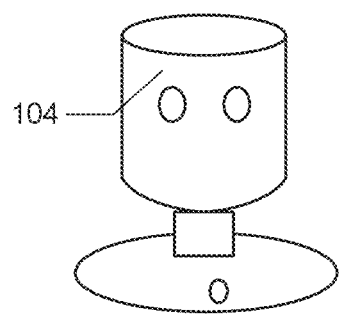
FIG. 3F schematically illustrates a schematic diagram of a first electronic device which is a binocular camera according to an embodiment of the present disclosure.

FIG. 3F schematically illustrates a schematic diagram of a first electronic device which is a binocular camera according to an embodiment of the present disclosure.

As shown in FIG. 3F, it is assumed that the first electronic device may comprise a camera. The camera may comprise a binocular camera 104, which may recognize at least one candidate electronic device in a picture, a first action (for example, a user's gesture) performed by an operating object, and depth information of the first action performed by the operating object, so as to implement a new interactive way to help users control other devices, for example, a second electronic device, in a scenario.

Figure 3G:
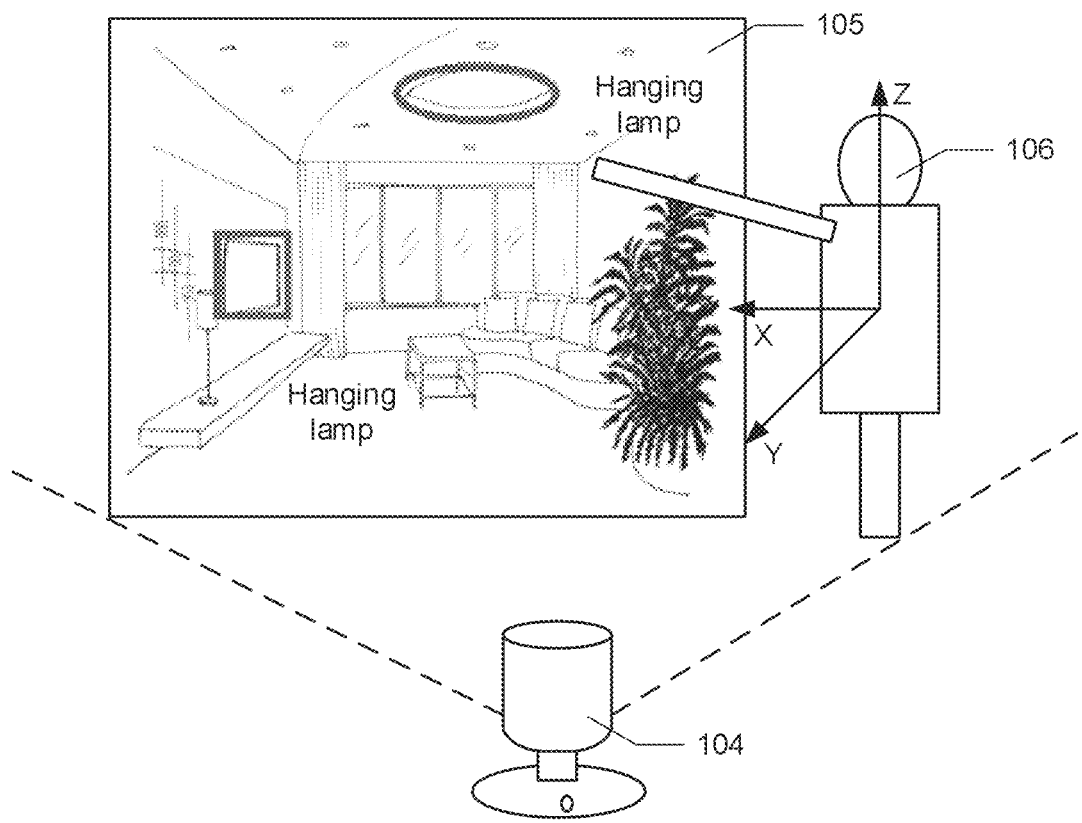
FIG. 3G schematically illustrates a schematic diagram of determining a second electronic device according to an embodiment of the present disclosure.

FIG. 3G schematically illustrates a schematic diagram of determining a second electronic device according to an embodiment of the present disclosure.

It should be illustrated that when an operating object and at least one candidate electronic device are located in a picture (also referred to as a target area) scanned by a first electronic device (for example, a camera), the first electronic device may initiate an action control function (for example, a gesture control function) of the first electronic device by recognizing a specific action (for example, a specific gesture) of the operating object. The first electronic device may recognize the action of the operating object and at least one candidate electronic device in the picture which may be manipulated by the first electronic device, and when a final presentation gesture of the action points to a certain electronic device, the first electronic device feeds back name information of the electronic device. If the name information satisfies the user's expectations, the electronic device is determined as a second electronic device, and the user may cause the first electronic device to control, for example, perform gesture slide control on, the second electronic device through a first action of the operating object.

In an embodiment of the present disclosure, as shown in FIG. 3G, it is assumed that the first electronic device is a binocular camera 104, which may acquire depth information of an object (comprising at least one device to be controlled) and a user 106 in a scenario 105 to establish a three-dimensional coordinate system. When the binocular camera 104 detects a gesture of starting manipulation of a device by the user 106, assuming that a neck of the user 106 and shoulders of the user 106 coincide in position, the position of the neck of the user 106 may be used as an origin to establish a three-dimensional coordinate system. A front direction of the user 106 is a positive direction of an x axis, a direction approaching the binocular camera 104 is a positive direction of a y axis, which is used to record depth information, and an upper direction is a positive direction of a z axis.

After the three-dimensional coordinates are established, steps of the binocular camera 104 focusing on an electronic device to be controlled which is pointed to by the user 106's gesture are as follows: a. calculating position coordinates of each of at least one candidate electronic device in the scenario 105 according to the three-dimensional coordinate system to record a position vector, so as to obtain at least one first position vector; b. when the binocular camera 104 detects a starting gesture of the user 106, the binocular camera 104 starting to track a position of a hand of the user 106, and then recording a second position vector of the hand as α when the hand shifts and stays at a certain position; c. comparing each of the at least one first position vector with the second position vector α, for example, determining a first angle between each of the at least one first position vector and a coordinate axis to obtain at least one first angle, determining a second angle between the second position vector and the coordinate axis, and then comparing each of the at least one first angle with the second angle; d. if there is an angle in the at least one first angle which is close to or equal to the second angle, the binocular camera 104 prompting name information of an electronic device corresponding to the angle close to or equal to the second angle through voice; and e. after the user 106 performs a confirmation gesture for the name information, confirming the electronic device in the at least one candidate electronic device which corresponds to the angle close to or equal to the second angle as an electronic device to be controlled, and the binocular camera 104 manipulating the electronic device to be controlled according to a recognition result obtained by recognizing the first action performed by the user 106, wherein the recognition result may be used to identify a manipulation instruction, which may comprise power-on, power-off, gear increase, gear reduction, etc.

The binocular camera device according to the embodiments of the present disclosure provides a new intelligent home control method, which may automatically recognize other devices in a scenario using an image recognition technology and a gesture recognition technology, store relevant recognition data, and then recognize the user's gesture action, which may achieve the purpose of controlling other intelligent devices in the home using gestures.

In addition, the embodiments of the present disclosure supplement the shortcomings that the current voice control has high requirements for distances and background noises, and help users operate different devices in the home in a more natural manner in a less restricted scenario.

Figure 4:
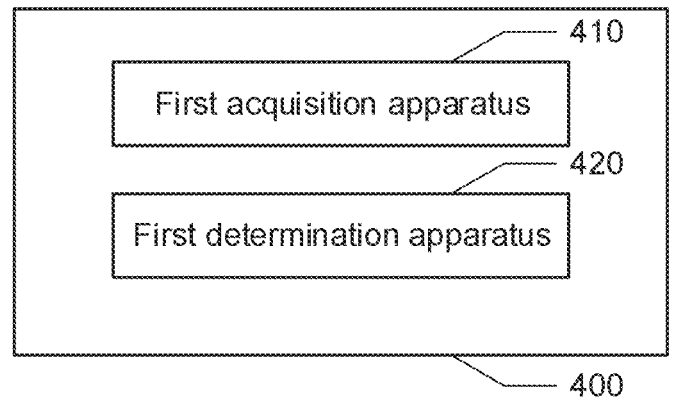
FIG. 4 schematically illustrates a block diagram of a system for determining an electronic device according to an embodiment of the present disclosure.

FIG. 4 schematically illustrates a block diagram of a system for determining an electronic device according to an embodiment of the present disclosure.

As shown in FIG. 4, the system for determining an electronic device may comprise a first acquisition apparatus 410 and a first determination apparatus 420, wherein the first acquisition apparatus 410 is configured to acquire a recognition result by recognizing a first action performed by an operating object through a first electronic device.

The first determination apparatus 420 is configured to determine a second electronic device which is controllable by the first electronic device according to the recognition result.

With the embodiment of the present disclosure, the master electronic device controls the electronic device to be controlled based on the recognition result obtained by recognizing the first action performed by the operating object, which help users operate the electronic device to be controlled in a more natural manner in a less restricted scenario, and may solve the defect that the existing voice confirmation manner not only has a defect of inaccurate semantic understanding, but also has high requirements for distances and environmental noises, thereby resulting in restricted usage scenarios.

Figure 5A:
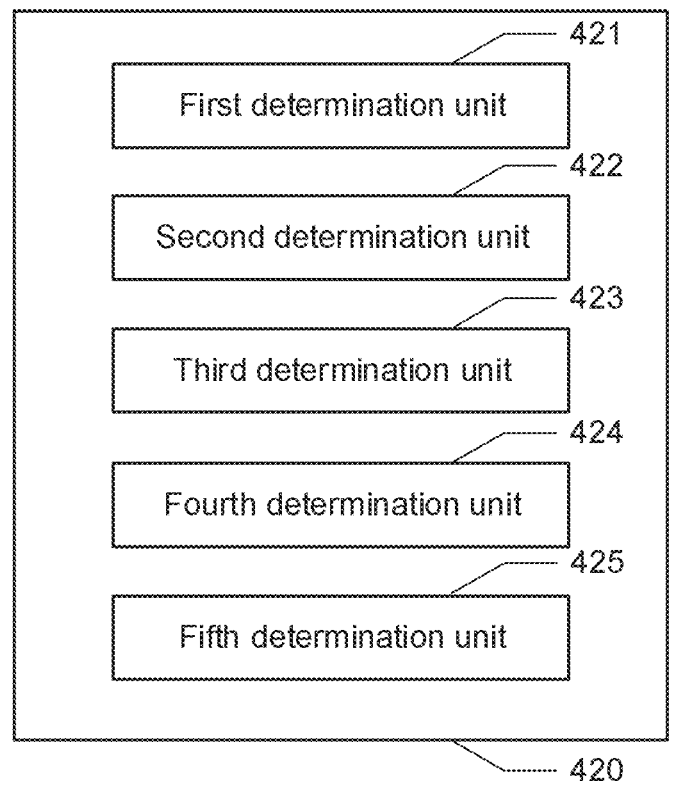
FIG. 5A schematically illustrates a block diagram of a first determination apparatus according to an embodiment of the present disclosure.

FIG. 5A schematically illustrates a block diagram of a first determination apparatus according to an embodiment of the present disclosure.

As shown in FIG. 5A, the first determination apparatus 420 may comprise a first determination unit 421, a second determination unit 422, a third determination unit 423, a fourth determination unit 424, and a fifth determination unit 425, wherein the first determination unit 421 is configured to determine at least one candidate electronic device which is controllable by the first electronic device.

The second determination unit 422 is configured to determine a coordinate origin.

The third determination unit 423 is configured to determine at least one first position vector corresponding to each of the at least one candidate electronic device, which starts from the coordinate origin and ends with a position of the candidate electronic device itself.

The fourth determination unit 424 is configured to determine a second position vector starting from the coordinate origin and ending with a position at which the operating object is located after a second action is performed by the operating object.

The fifth determination unit 425 is configured to determine the second electronic device from the at least one candidate electronic device based on the at least one first position vector and the second position vector.

With the embodiment of the present disclosure, the electronic device to be controlled is determined from the at least one candidate electronic device based on the at least one first position vector and the second position vector, so that a control operation may be performed on the electronic device to be controlled, which not only improves the accuracy of control, but also may improve user experience.

Figure 5B:
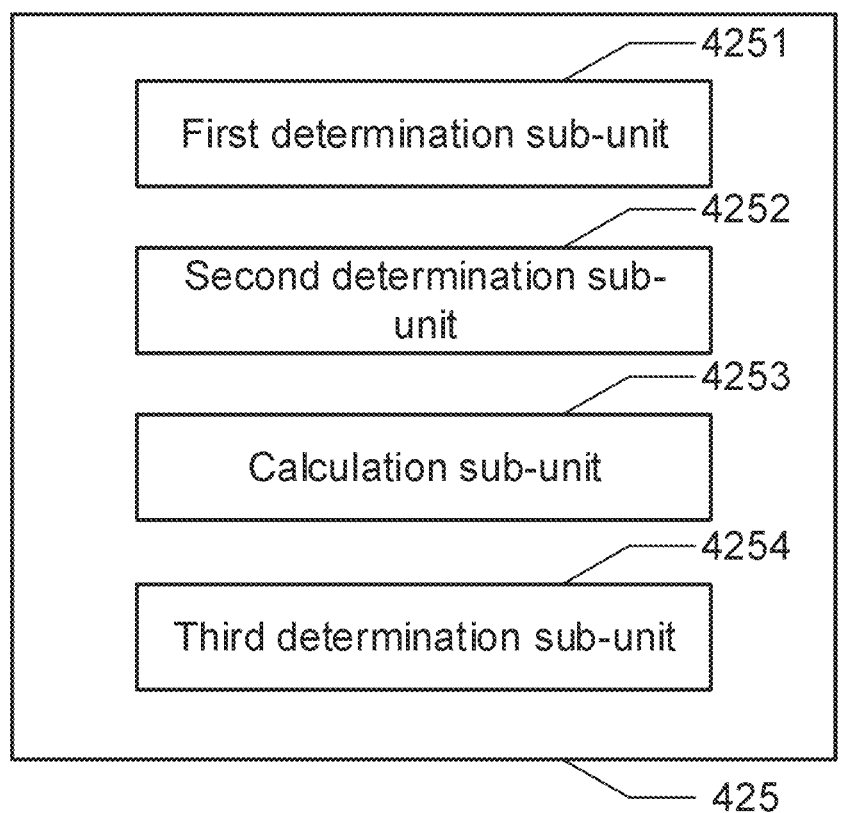
FIG. 5B schematically illustrates a block diagram of a fifth determination unit according to an embodiment of the present disclosure.

FIG. 5B schematically illustrates a block diagram of a fifth determination unit according to an embodiment of the present disclosure.

As shown in FIG. 5B, the fifth determination unit 425 may comprise a first determination sub-unit 4251, a second determination sub-unit 4252, a calculation sub-unit 4253, and a third determination sub-unit 4254, wherein the first determination sub-unit 4251 is configured to determine at least one first angle formed by all of the at least one first position vector and the same coordinate axis.

The second determination sub-unit 4252 is configured to determine a second angle formed by the second position vector and the same coordinate axis.

The calculation sub-unit 4253 is configured to calculate an angle difference between each of the at least one first angle and the second angle to obtain a corresponding at least one angle difference.

The third determination sub-unit 4254 is configured to, in a case that there is an angle difference in the at least one angle difference which is less than or equal to a predetermined angle, determine an electronic device in the at least one candidate electronic device, which corresponds to the angle difference less than or equal to the predetermined angle, as the second electronic device.

With the embodiment of the present disclosure, the electronic device in the at least one candidate electronic device Which corresponds to the angle difference less than or equal to the predetermined angle is determined as the electronic device to be controlled, which may further improve the accuracy of determining the electronic device to be controlled.

Figure 5C:
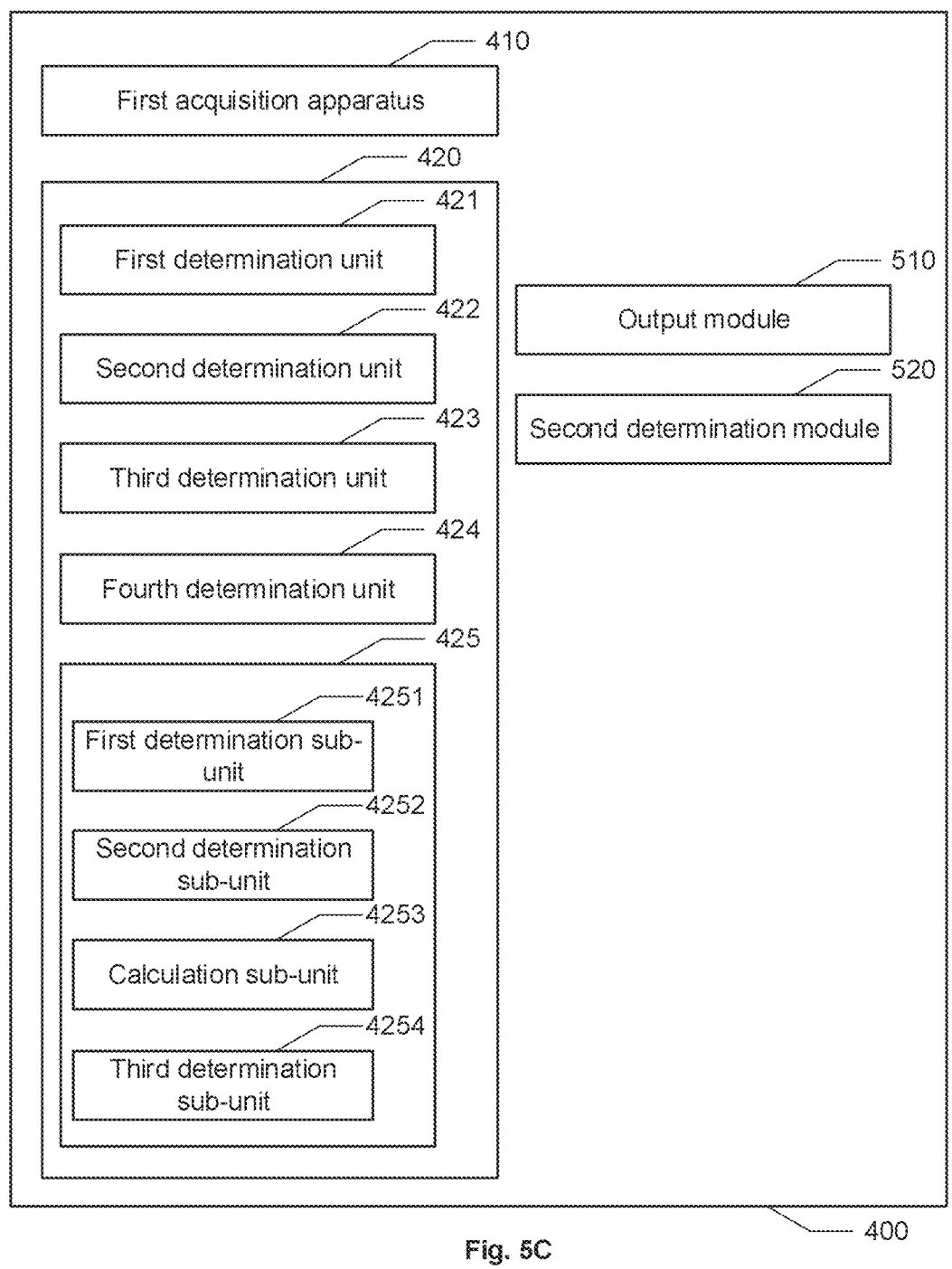
FIG. 5C schematically illustrates a block diagram of a system for determining an electronic device according to another embodiment of the present disclosure.

FIG. 5C schematically illustrates a block diagram of a system for determining an electronic device according to another embodiment of the present disclosure.

As shown in FIG. 5C, the system 400 for determining an electronic device may further comprise an output apparatus 510 and a second determination apparatus 520, wherein the output apparatus 510 is configured to output name information of the corresponding electronic device, before determining an electronic device in the at least one candidate electronic device which corresponds to the angle difference less than or equal to the predetermined angle as the second electronic device.

The second determination apparatus 520 is configured to determine the corresponding electronic device as the second electronic device in a case that the operating object performs a confirmation operation for the name information.

With the embodiment of the present disclosure, in a case that the confirmation operation performed by the operating object for the name information is received, the electronic device in the at least one candidate electronic device which corresponds to the angle difference less than or equal to the predetermined angle is determined as the electronic device to be controlled, which may more accurately determine the electronic device to be controlled which is desired to be manipulated by the user through the master electronic device.

As an alternative embodiment, in a process of the first electronic device determining the at least one candidate electronic device which is controllable by the first electronic device, for each electronic device in a target area, an image of the electronic device is acquired; a first integral image of the image of the electronic device is calculated; at least one predetermined integral image is acquired, wherein the predetermined integral image is obtained by calculating a predetermined template image, and the predetermined template image is an image obtained through the electronic device which is controllable by the first electronic device; a first similarity between the first integral image and each of the at least one predetermined integral image is calculated to obtain at least one first similarity; and in a case that there is a similarity in the at least one first similarity that satisfies a first similarity threshold, the electronic device is determined as the candidate electronic device.

With the embodiment of the present disclosure, in a case that there is a similarity in the at least one first similarity that satisfies the first similarity threshold, the electronic device is determined as the candidate electronic device, so as to obtain at least one candidate electronic device, so that the master electronic device may determine the electronic device to be controlled Which is desired to be manipulated by the user from the at least one candidate electronic device.

Figure 5D:
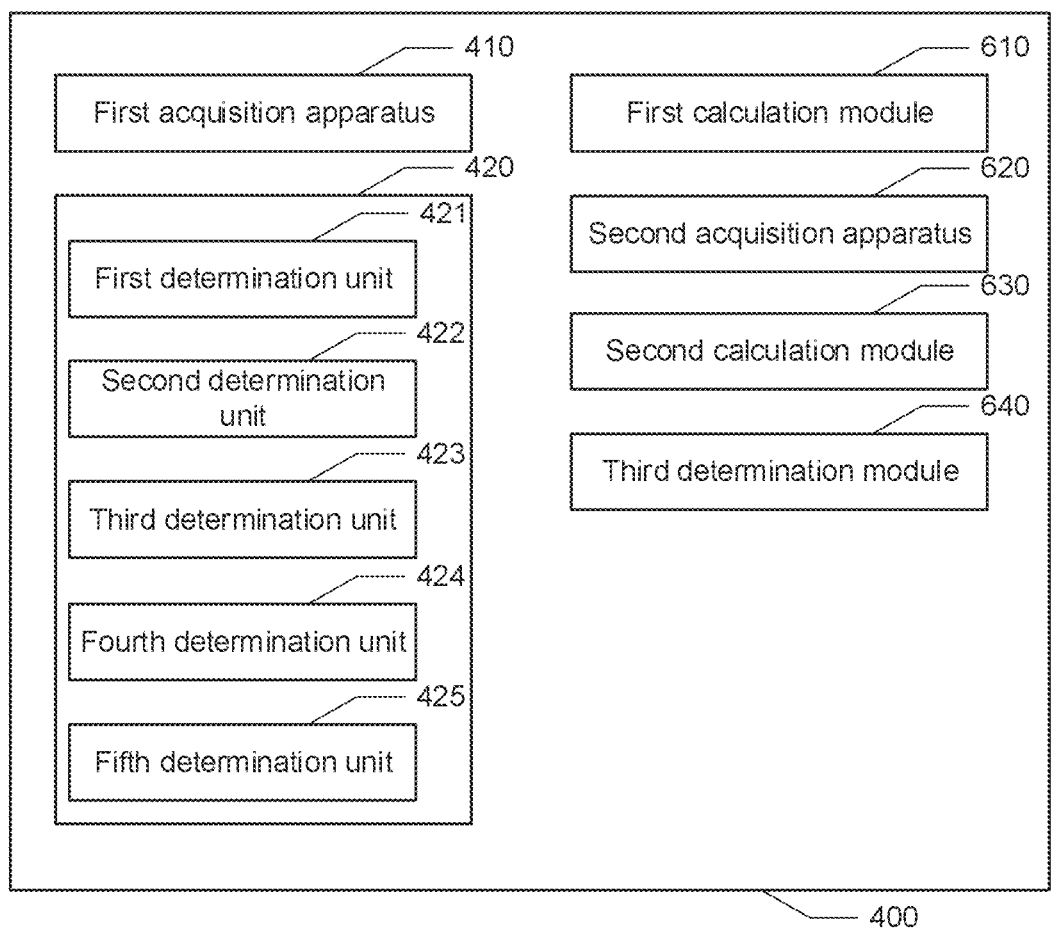
FIG. 5D schematically illustrates a block diagram of a system for determining an electronic device according to another embodiment of the present disclosure.

FIG. 5D schematically illustrates a block diagram of a system for determining an electronic device according to another embodiment of the present disclosure.

As shown in FIG. 5D, the system 400 for determining an electronic device may further comprise a first calculation apparatus 610, a second acquisition apparatus 620, a second calculation apparatus 630, and a third determination apparatus 640, wherein the first calculation apparatus 610 is configured to calculate a first histogram of the image corresponding to the electronic device before determining the electronic device as the candidate electronic device.

The second acquisition apparatus 620 is configured to acquire at least one predetermined histogram, wherein the predetermined histogram is obtained by calculating a predetermined template image.

The second calculation apparatus 630 is configured to calculate a second similarity between the first histogram and each of the at least one predetermined histogram to obtain at least one second similarity.

The third determination apparatus 640 is configured to determine the electronic device as the candidate electronic device in a case that there is a similarity in the at least one first similarity that satisfies the first similarity threshold and there is also a similarity in the at least one second similarity that satisfies a second similarity threshold.

With the embodiment of the present disclosure, in a case that the first similarity satisfies the first similarity threshold and the second similarity also satisfies the second similarity threshold, the electronic device is determined as one of the candidate electronic devices, which may improve the accuracy of each of the determined candidate electronic devices.

It may be understood that the first acquisition apparatus 410, the first determination apparatus 420, the output apparatus 510, the second determination apparatus 520, the first calculation apparatus 610, the second acquisition apparatus 620, the second calculation apparatus 630, the third determination apparatus 640, the first determination unit 421, the second determination unit 422, the third determination unit 423, the fourth determination unit 424, the fifth determination unit 425, the first determination sub-unit 4251, the second determination sub-unit 4252, the calculation sub-unit 4253, and the third determination sub-unit 4254 may be combined and implemented in one apparatus/unit/sub-unit, or any of the above apparatuses/units/sub-units may be split into multiple apparatuses/units/sub-units. Alternatively, at least a part of functions of one or more of these apparatuses/units/sub-units may be combined with at least a part of functions of other apparatuses/units/sub-units, and are implemented in one apparatus/unit/sub-unit. According to an embodiment of the present disclosure, at least one of the first acquisition apparatus 410, the first determination apparatus 420, the output apparatus 510, the second determination apparatus 520, the first calculation apparatus 610, the second acquisition apparatus 620, the second calculation apparatus 630, the third determination apparatus 640, the first determination unit 421, the second determination unit 422, the third determination unit 423, the fourth determination unit 424, the fifth determination unit 425, the first determination sub-unit 4251, the second determination sub-unit 4252, the calculation sub-unit 4253, and the third determination sub-unit 4254 may be at least partially implemented as a hardware circuit, for example, a Field Programmable Gate Array (FPGA), a Programmable Logic Array (PLA), an on-chip system, an on-substrate system, and an on-package system, or an Application Specific Integrated Circuit (ASIC), or may be implemented as hardware or firmware which is implemented by integrating or encapsulating a circuit in any other reasonable manner, or may be implemented by an appropriate combination of software, hardware, and firmware. Alternatively, at least one of the first acquisition apparatus 410, the first determination apparatus 420, the output apparatus 510, the second determination apparatus 520, the first calculation apparatus 610, the second acquisition apparatus 620, the second calculation apparatus 630, the third determination apparatus 640, the first determination unit 421, the second determination unit 422, the third determination unit 423, the fourth determination unit 424, the fifth determination unit 425, the first determination sub-unit 4251, the second determination sub-unit 4252, the calculation sub-unit 4253, and the third determination sub-unit 4254 may be at least partially implemented as a computer program apparatus/unit/sub-unit which, when executed by a computer, may perform a function of the corresponding apparatus/unit/sub-unit.

Another aspect of the present disclosure provides a device for determining an electronic device, comprising a collection apparatus, a recognition apparatus, and a processing apparatus, wherein the collection apparatus is configured for a first action performed by an operating object, the recognition apparatus is configured to recognize the first action to obtain a recognition result, and the processing apparatus is configured to determine a second electronic device which is controllable according to the recognition result.

According to an embodiment of the present disclosure, the above device for determining an electronic device further comprises: a signal transmission apparatus configured to transmit a signal to the second electronic device which is controllable.

Another aspect of the present disclosure provides a system for determining an electronic device, comprising at least one first electronic device and at least one second electronic device, wherein the at least one first electronic device is configured to recognize a first action performed by an operating object, to obtain a recognition result, and determine a second electronic device which is controllable by the first electronic device according to the recognition result.

Yet another aspect of the present disclosure provides a computer system, comprising: one or more processors; and a computer-readable storage medium having stored thereon one or more programs which, when executed by the one or more processors, cause the one or more processors to perform the method for controlling an electronic device described above in any of the embodiments.

Figure 6:
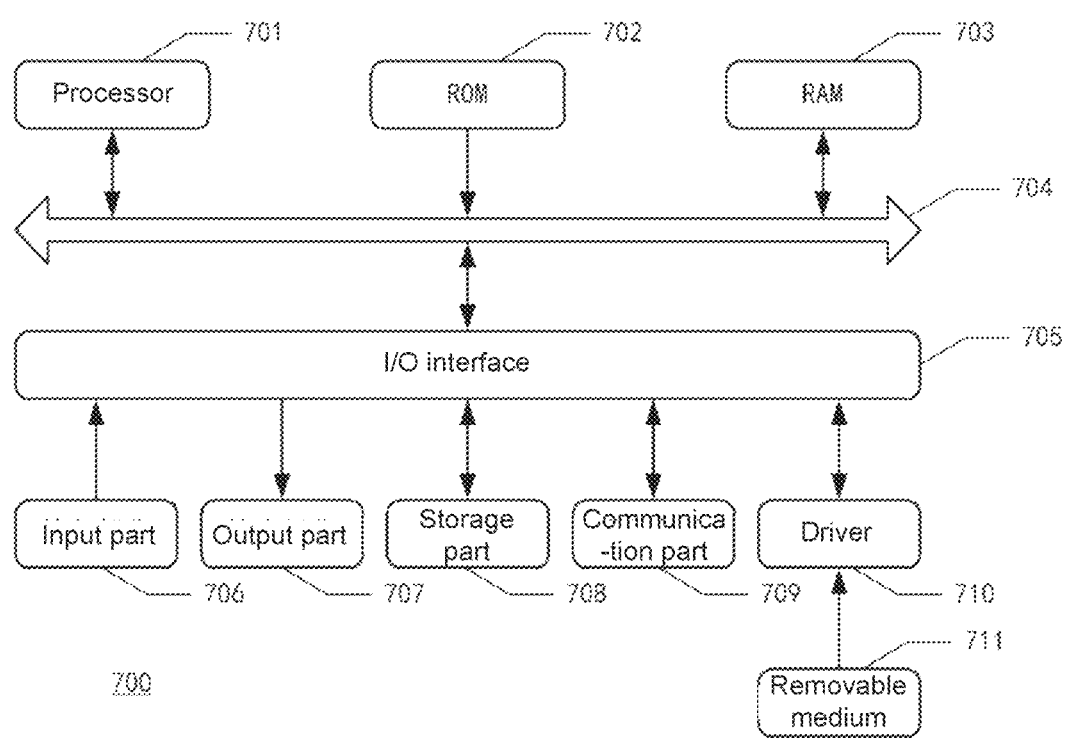
FIG. 6 schematically illustrates a block diagram of a computer system suitable for implementing a method for determining an electronic device according to an embodiment of the present disclosure.

FIG. 6 schematically illustrates a block diagram of a computer system suitable for implementing a method for determining an electronic device according to an embodiment of the present disclosure. The computer system shown in FIG. 6 is only an example, and should not bring any limitation to functions and scopes of use of the embodiments of the present disclosure.

As shown in FIG. 6, a computer system 700 according to an embodiment of the present disclosure comprises a processor 701, which may execute various appropriate actions and processing according to a program stored in a Read-Only Memory (ROM) 702 or a program loaded from a storage part 708 into a Random Access Memory (RAM) 703. The processor 701 may comprise, for example, a general-purpose microprocessor (for example, a CPU), an instruction set processor and/or a related chipset and/or a special-purpose microprocessor (for example, an Application Specific Integrated Circuit (ASIC)) etc. The processor 701 may further comprise an on-board memory for caching purposes. The processor 701 may comprise a single processing unit or multiple processing units for performing different actions of a flow of a method according to an embodiment of the present disclosure.

Various programs and data required for operations of the computer system 700 are stored in the RAM 703. The processor 701, the ROM 702, and the RAM 703 are connected to each other through a bus 704. The processor 701 executes the above various operations by executing the programs in the ROM 702 and/or RAM 703. It should be illustrated that the programs may also be stored in one or more memories other than the ROM 702 and the RAM 703. The processor 701 may also execute the above various operations by executing the programs stored in the one or more memories.

According to an embodiment of the present disclosure, the computer system 700 may further comprise an Input/Output (I/O) interface 705, which is also connected to the bus 704. The computer system 700 may further comprise one or more of the following components connected to the I/O interface 705: an input part 706 including a keyboard, a mouse, etc.; an output part 707 including a Cathode Ray Tube (CRT), a Liquid Crystal Display (LCD), and a speaker etc.; a storage part 708 including a hard disk etc.; and a communication part 709 including a network interface card such as a LAN card, a modem, etc. The communication part 709 performs communication processing via a network such as the Internet. A driver 710 is also connected to the I/O interface 705 as needed. A removable medium 711, such as a magnetic disk, an optical disk, a magneto-optical disk, a semiconductor memory, etc., is installed on the driver 710 as needed, so that a computer program read therefrom is installed into the storage part 708 as needed.

According to an embodiment of the present disclosure, the method described above with reference to the flowchart may be implemented as a computer software program. For example, the embodiments of the present disclosure comprise a computer program product, which comprises a computer program carried on a computer-readable medium, and the computer program contains program codes for executing the method shown in the flowchart. In such an embodiment, the computer program may be downloaded and installed from the network through the communication part 709, and/or installed from the removable medium 711. When the computer program is executed by the processor 701, the processor 701 executes the above functions defined in the system according to the embodiment of the present disclosure. According to the embodiments of the present disclosure, the above systems, devices, apparatuses, units, etc. may be implemented by computer program modules.

It should be illustrated that the computer-readable medium shown in the present disclosure may be a computer-readable signal medium or a computer-readable storage medium, or any combination thereof. The computer-readable storage medium may be, for example, but not limited to, an electric, magnetic, optical, electromagnetic, infrared, or semiconductor system, apparatus, or device, or any combination thereof. More specific examples of the computer-readable storage media may comprise, but not limited to, electrical connections with one or more wires, a portable computer disk, a hard disk, a RAM, a ROM, an Erasable Programmable Read-Only Memory (EPROM or a flash memory), an optical fiber, a portable Compact Disk Read-Only Memory (CD-ROM), an optical storage device, a magnetic storage device, or any suitable combination thereof. In the present disclosure, the computer-readable storage medium may be any tangible medium which contains or stores a program, which may be used by or in combination with an instruction execution system, apparatus, or device. In the present disclosure, the computer-readable signal medium may comprise a data signal propagated in a baseband or as a part of a carrier wave, and a computer-readable program code is carried in the data signal. This propagated data signal may take many forms, including, but not limited to, an electromagnetic signal, an optical signal, or any suitable combination thereof. The computer-readable signal medium may also be any computer-readable medium other than the computer-readable storage medium. The computer-readable medium may send, propagate, or transmit the program which is used by or in combination with the instruction execution system, apparatus, or device. The program code contained on the computer-readable medium may be transmitted by any suitable medium, including, but not limited to, a wireless manner, a wired manner, an optical cable, RE, etc., or any suitable combination thereof. According to an embodiment of the present disclosure, the computer-readable medium may comprise the ROM 702 and/or the RAM 703 and/or one or more memories other than the ROM 702 and/or the RAM 703.

The flowcharts and block diagrams in the accompanying drawings illustrate architecture, functions, and operations which may be implemented by the system, method, and computer program product according to various embodiments of the present disclosure. In this regard, each block in the flowcharts or block diagrams may represent an apparatus, a program segment, or a part of codes, and the apparatus, the program segment, or the part of codes contains one or more executable instructions for realizing specified logical functions. It should also be illustrated that, in some alternative implementations, functions marked in a block may also occur in a different order from that marked in the accompanying drawings. For example, two blocks shown in succession may actually be executed substantially in parallel, or may sometimes be executed in a reverse order, depending on functions involved. It should also be illustrated that each block in the block diagrams or flowcharts, and a combination of blocks in the block diagrams or flowcharts, may be implemented by a dedicated hardware-based system that performs the specified functions or operations, or may be implemented by a combination of dedicated hardware and computer instructions.

As another aspect, the present disclosure further provides a computer-readable medium having stored thereon executable instructions which, when executed by a processor, cause the processor to realize the method for determining an electronic device described in any of the above embodiments. The computer-readable medium may be included in the device described in the above embodiments; or may exist alone without being assembled into the device. The above computer-readable medium carries one or more programs which, when executed by such a device, cause the device to: acquire a recognition result by recognizing a first action performed by an operating object through a first electronic device; and determine a second electronic device which is controllable by the first electronic device according to the recognition result.

The embodiments of the present disclosure have been described above. However, these embodiments are for illustrative purposes only, and are not intended to limit the scope of the present disclosure. Although the embodiments are described above respectively, it does not mean that the measures in the respective embodiments may not be advantageously used in combination. The scope of the present disclosure is defined by the appended claims and their equivalents. Without departing from the scope of the present disclosure, those skilled in the art may make various substitutions and modifications, which should fall within the scope of the present disclosure.

What is claimed is:

1. A method for determining an electronic device, comprising:
   acquiring a recognition result by recognizing a first action performed by an operating object through a first electronic device; and
   determining a second electronic device which is controllable by the first electronic device according to the recognition result;
   wherein determining a second electronic device which is controllable by the first electronic device comprises:
      determining at least one candidate electronic device which is controllable by the first electronic device,
      determining a coordinate origin,
      determining at least one first position vector corresponding to each of the at least one candidate electronic device, and the at least one first position vector starts from the coordinate origin and ends with a position of the candidate electronic device itself,
      determining a second position vector starting from the coordinate origin and ending with a position at which the operating object is located after the operating object performs a second action, and
      determining the second electronic device from the at least one candidate electronic device based on the at least one first position vector and the second position vector, and
   wherein determining the second electronic device from the at least one candidate electronic device comprises:
      determining at least one first angle formed by all of the at least one first position vector and the same coordinate axis,
      determining a second angle formed by the second position vector and the same coordinate axis, calculating an angle difference between each of the at least one first angle and the second angle to obtain corresponding at least one angle difference, in a case that there is an angle difference in the at least one angle difference which is less than or equal to a predetermined angle, determining an electronic device in the at least one candidate electronic device, which corresponds to the angle difference less than or equal to the predetermined angle, as the second electronic device, before determining the electronic device in the at least one candidate electronic device, which corresponds to the angle difference less than or equal to the predetermined angle, as the second electronic device, outputting name information of the corresponding electronic device, and in a case that the operating object performs a confirmation operation for the name information, determining the corresponding electronic device as the second electronic device.

2. The method according to claim 1, wherein in a process of determining at least one candidate electronic device which is controllable by the first electronic device, for each electronic device in a target area, acquiring an image of the electronic device;

calculating a first integral image of the image of the electronic device;

acquiring at least one predetermined integral image, wherein the predetermined integral image is obtained by calculating a predetermined template image, and the predetermined template image is an image obtained through an electronic device which is controllable by the first electronic device;

calculating a first similarity between the first integral image and each of the at least one predetermined integral image to obtain at least one first similarity; and in a case that there is a similarity in the at least one first similarity that satisfies a first similarity threshold, determining the electronic device as the candidate electronic device.

3. The method according to claim 2, further comprising:

before determining the electronic device as the candidate electronic device, calculating a first histogram of the image corresponding to the electronic device;

acquiring at least one predetermined histogram, wherein the predetermined histogram is obtained by calculating the predetermined template image;

calculating a second similarity between the first histogram and each of the at least one predetermined histogram to obtain at least one second similarity; and in a case that there is a similarity in the at least one first similarity that satisfies the first similarity threshold and there is also a similarity of the at least one second similarity that satisfies a second similarity threshold, determining the electronic device as the candidate electronic device.

4. The method according to claim 1, further comprising:

after determining the second electronic device which is controllable by the first electronic device, receiving, by the second electronic device, voice information of a user and making a response to the voice information of the user.

5. A computer system, comprising:

one or more processors; and a memory having stored thereon one or more programs, wherein the one or more programs, when executed by the one or more processors, cause the one or more processors to acquire a recognition result by recognizing a first action performed by an operating object through a first electronic device; and determine a second electronic device which is controllable by the first electronic device according to the recognition result, wherein the processor is further configured to:

determine at least one candidate electronic device which is controllable by the first electronic device, determine a coordinate origin, determine at least one first position vector corresponding to the at least one candidate electronic device, and the at least one first position vector starts from the coordinate origin and ends with a position of the candidate electronic device itself, determine a second position vector starting from the coordinate origin and ending with a position at which the operating object is located after the operating object performs a second action, and determine the second electronic device from the at least one candidate electronic device based on the at least one first position vector and the second position vector, wherein the processor is further configured to:

determine at least one first angle formed by all of the at least one first position vector and the same coordinate axis, determine a second angle formed by the second position vector and the same coordinate axis, calculate an angle difference between each of the at least one first angle and the second angle to obtain corresponding at least one angle difference, and in a case that there is an angle difference in the at least one angle difference which is less than or equal to a predetermined angle, determine an electronic device in the at least one candidate electronic device, which corresponds to the angle difference less than or equal to the predetermined angle, as the second electronic device, and wherein the processor is further configured to:

before determining the electronic device in the at least one candidate electronic device, which corresponds to the angle difference less than or equal to the predetermined angle, as the second electronic device, output name information of the corresponding electronic device, and in a case that the operating object performs a confirmation operation for the name information, determine the corresponding electronic device as the second electronic device.

6. A non-transitory computer-readable storage medium having stored thereon executable instructions which, when executed by a processor, cause the processor to:

acquire a recognition result by recognizing a first action performed by an operating object through a first electronic device, and determine a second electronic device which is controllable by the first electronic device according to the recognition result, wherein the processor is further configured to:

determine at least one candidate electronic device which is controllable by the first electronic device, determine a coordinate origin, determine at least one first position vector corresponding to the at least one candidate electronic device, and the at least one first position vector starts from the coordinate origin and ends with a position of the candidate electronic device itself, determine a second position vector starting from the coordinate origin and ending with a position at which the operating object is located after the operating object performs a second action, and determine the second electronic device from the at least one candidate electronic device based on the at least one first position vector and the second position vector, wherein the processor is further configured to:

determine at least one first angle formed by all of the at least one first position vector and the same coordinate axis, determine a second angle formed by the second position vector and the same coordinate axis, calculate an angle difference between each of the at least one first angle and the second angle to obtain corresponding at least one angle difference, and in a case that there is an angle difference in the at least one angle difference which is less than or equal to a predetermined angle, determine an electronic device in the at least one candidate electronic device, which corresponds to the angle difference less than or equal to the predetermined angle, as the second electronic device, wherein the processor is further configured to:

before determining the electronic device in the at least one candidate electronic device, which corresponds to the angle difference less than or equal to the predetermined angle, as the second electronic device, output name information of the corresponding electronic device, and in a case that the operating object performs a confirmation operation for the name information, determine the corresponding electronic device as the second electronic device.

7. The computer system according to claim 5, further comprising:
a signal transmitter configured to transmit a signal to the second electronic device which is controllable.

8. The method according to claim 1, the operating object comprises a human hand, the second action comprises a pointing action,
wherein determining a second position vector starting from the coordinate origin and ending with a position at which the operating object is located after the operating object performs a second action comprises:
determining a second position vector starting from the coordinate origin and ending with a position at which the human hand is located after the human hand performs the pointing action.

9. The computer system according to claim 5, wherein the processor is further configured to:
determine a second position vector starting from the coordinate origin and ending with a position at which a human hand is located after the human hand performs a pointing action.

10. The computer system according to claim 5, wherein the processor is further configured to:
in a process of determining at least one candidate electronic device which is controllable by the first electronic device, for each electronic device in a target area,
acquire an image of the electronic device;
calculate a first integral image of the image of the electronic device;
acquire at least one predetermined integral image, wherein the predetermined integral image is obtained by calculating a predetermined template image, and the predetermined template image is an image obtained through an electronic device which is controllable by the first electronic device;
calculate a first similarity between the first integral image and each of the at least one predetermined integral image to obtain at least one first similarity; and
in a case that there is a similarity in the at least one first similarity that satisfies a first similarity threshold, determine the electronic device as the candidate electronic device.

11. The non-transitory computer-readable storage medium according to claim 6, wherein the processor is further configured to:
determine a second position vector starting from the coordinate origin and ending with a position at which a human hand is located after the human hand performs a pointing action.

* * * * *